United States Patent
Busker et al.

[15] 3,694,737
[45] Sept. 26, 1972

[54] MICROWAVE MOISTURE SENSING SYSTEM AND METHOD

[72] Inventors: Leroy H. Busker, Rockton, Ill.; Robert J. Mosher, Beloit, Wis.

[73] Assignee: Beloit Corporation, Beloit, Wis.

[22] Filed: Aug. 3, 1970

[21] Appl. No.: 67,643

Related U.S. Application Data

[62] Division of Ser. No. 679,325, Oct. 31, 1967, Pat. No. 3,599,088.

[52] U.S. Cl. ............................................. 324/58.5 A
[51] Int. Cl. .................................................. G01r 27/04
[58] Field of Search ........................... 324/58, 58.5

[56] References Cited

UNITED STATES PATENTS

| | | | |
|---|---|---|---|
| 3,079,551 | 2/1963 | Walker | 324/58.5 A |
| 3,460,031 | 8/1969 | Evans | 324/58.5 A |
| 2,457,695 | 12/1948 | Liskow | 324/58.5 A |

Primary Examiner—Michael J. Lynch
Attorney—Hill & Hill and Hill, Sherman, Meroni, Gross & Simpson

[57] ABSTRACT

An apparatus for measuring the amount of moisture in a sample which is generally formed of a microwave energy source, a microwave radiating element connected to the source, a microwave energy receiving element, and a microwave energy indication connected to the receiving element. The sample is positioned between the radiating and receiving elements and a structure is provided for changing the energy transmission path through the sample by at least one-half wavelength of the microwave energy. Such means may take the form of a frequency modulator connected to the source, a dielectric disc in the transmission path, or a structure for continuously changing the distance between the radiating element and the sample or combination of these means.

1 Claim, 16 Drawing Figures

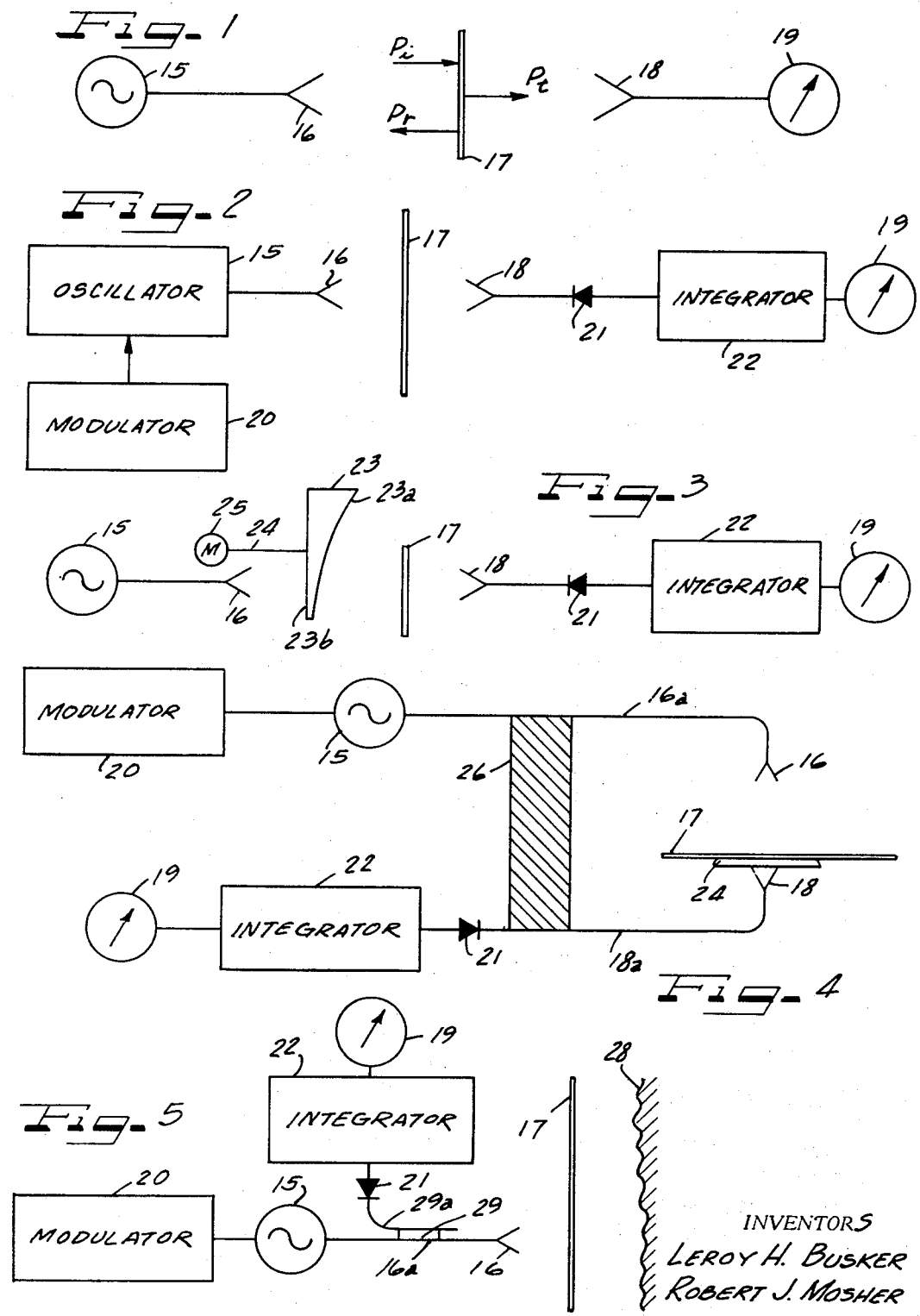

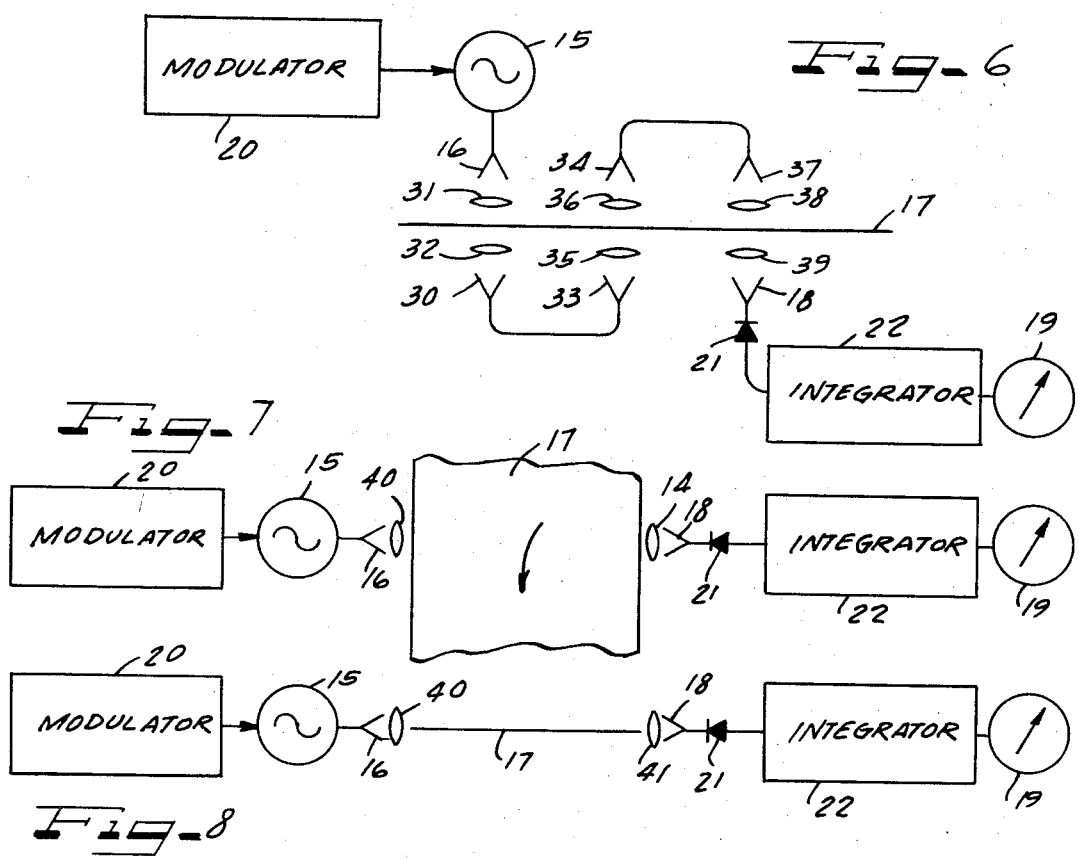
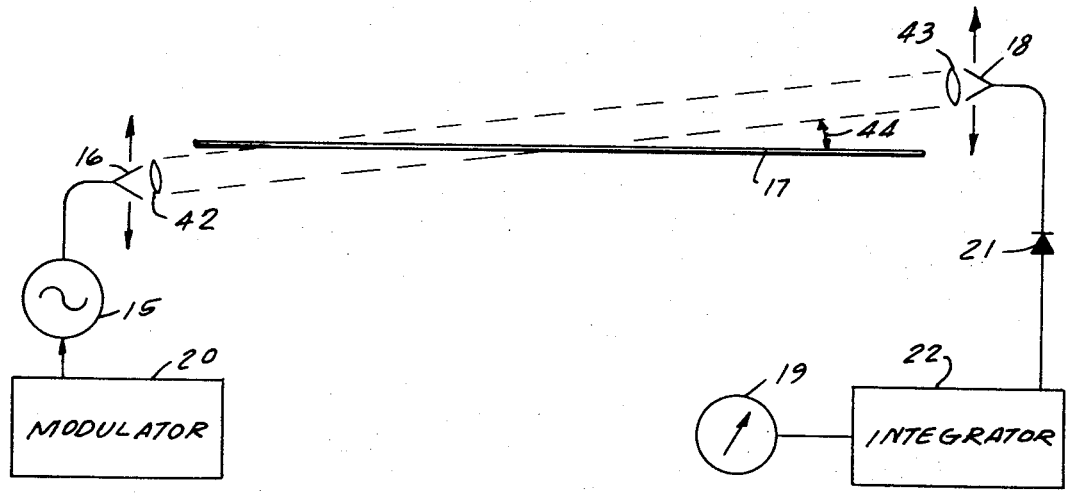

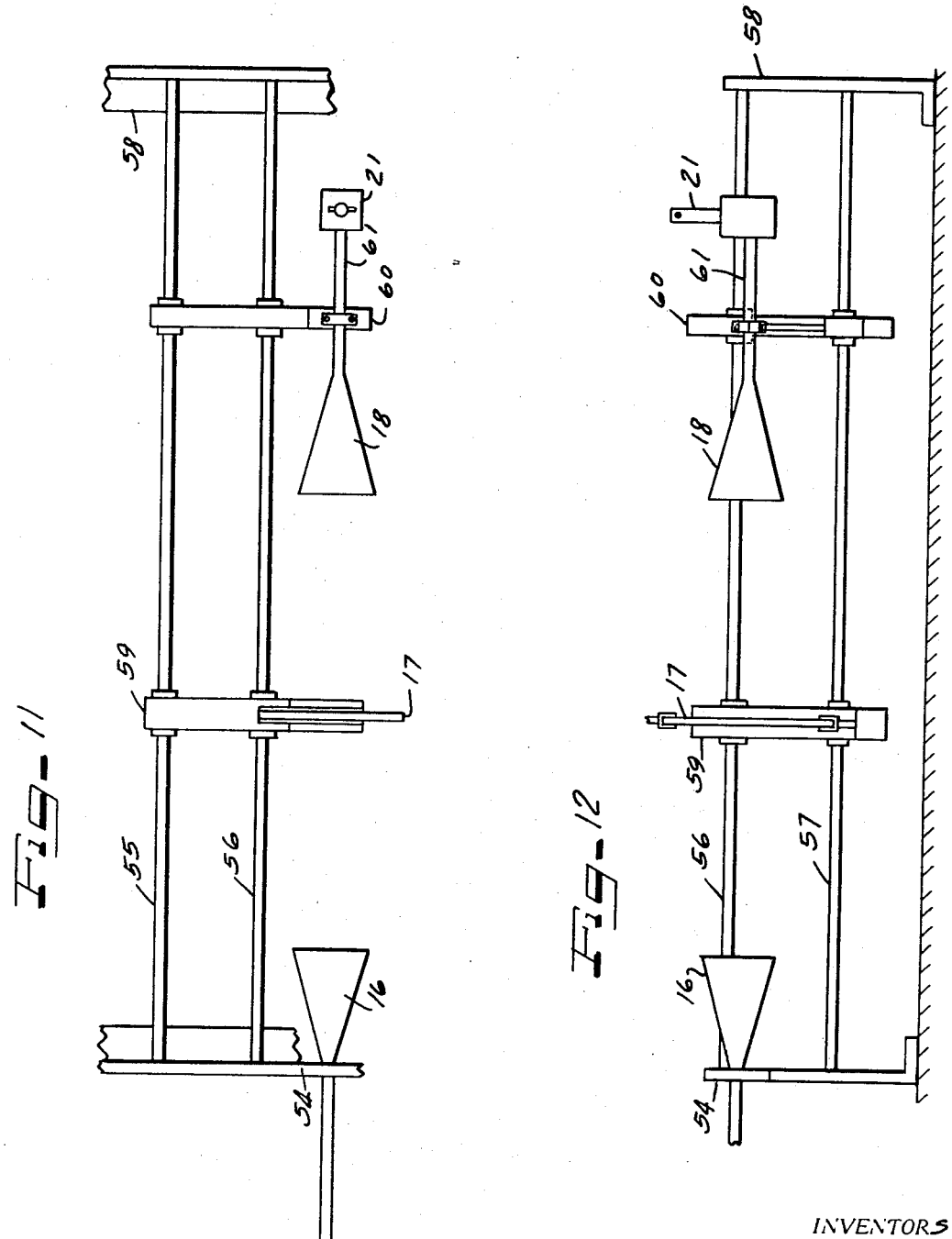

MICROWAVE MOISTURE SENSING SYSTEM AND METHOD

CROSS REFERENCE TO RELATED APPLICATIONS

This application is a division of application Ser. No. 679,325 filed Oct. 31, 1967 entitled Microwave Moisture Sensing System Including Means To Continuously Change The Transmission Path of the Microwave Energy, now U.S. Pat. No. 3,599,088 which issued on Aug. 10, 1971.

BACKGROUND OF THE INVENTION

1. Field of the Invention

This invention relates generally to a method of an apparatus for sensing constituent of a material which exhibits an influence on microwave energy and more particularly to a method of an apparatus for measuring the amount of moisture in a material. The present invention has specific applicability in the measurement of moisture content in paper, paper products, pulp slurries, and the like materials. In general, however, the present invention can be employed to measure the moisture content of any material, whether liquid, semi-liquid, or solid.

2. Description of the Prior Art

The method for measuring moisture content of material which consists of placing a sample between two microwave horns which are connected to a microwave generator and a microwave detector is well known in the prior art. However, this technique is applicable only when the position of the sample between the horns and the distance between the horns can be accurately maintained. It has been found that there is a drastic effect upon the moisture signal due to the position of the sample with respect to the microwave horns.

It is well established that a dielectric sample placed between a microwave sending and receiving horn will establish a standing wave due to reflection of energy from the faces of the dielectric. If the receiving horn is assumed to have no reflection, then without the sample present, no standing wave exists. However, when the sample is placed between the horns, a standing wave is established which is dependent upon the amount of reflected energy from the surface and the position of the sample.

When the moisture content of a paper web, for example, is being measured, the position of the web cannot be maintained fixed with respect to the horns without a considerable amount of difficulty being encountered. In the measurement of moisture of a paper web, it is necessary to scan across the paper web to determine the moisture content of the entire width thereof. Such a scanning of the paper web, which requires either movement of the horns, or movement of the web with respect to the horns, usually results in some change in the distance between the horns and the web. As a result of such a change, the standing wave which exists will affect the amount of energy which is reflected from the surface of the sample. Since the measurement of such reflected energy or the measurement of the transmitted energy is employed in the determination of the moisture content within the sample, such a change of position of the sample will result in erroneous readings indicative of the moisture content.

In the manufacture of paper, the moisture content of a paper web must be determined during the manufacturing process. That is, when the paper web is being dryed, for instance, it may be desirable to determine the moisture content therein. Since such drying of the paper web is effected on drying rolls, the measurement of the moisture content must necessarily be effective at some point intermediate the drying rolls where the measuring apparatus can be easily inserted and mounted with respect to the traveling paper web. However, a traveling paper web at a point intermediate a pair of drying rolls normally has a component of movement transverse to the plane thereof. That is, between the drying rolls, a traveling paper web may "flutter." Such movement of the paper web would be towards and away from the microwave horns positioned on opposite side thereof employed for measuring the moisture content thereof. Such movement with respect to the microwave horns, as discussed above, would produce erroneous readings with respect to the moisture content thereof. Therefore, a need exists for a system which eliminates the position sensitivity of a sample.

SUMMARY OF THE INVENTION

It is, therefore, an object of the present invention to provide an apparatus for measuring the amount of moisture in a sample which eliminates the difficulty of the standing wave resulting from the position of a sample.

It is another object of the present invention to provide an apparatus for measuring the moisture content in a sample which eliminates the difficulty of the changing reflection from the sample surface as its spacing between the microwave horns changes.

These and other objects are realized by the structure of the present invention which generally includes a microwave energy radiating element positioned to impinge microwave energy on the sample, a microwave energy receiving element positioned to receive microwave energy transmitted through the sample, and means for continuously changing the transmission path from the radiating element to the sample as measured in wave lengths of the microwave energy at least one-half wavelength of the microwave energy.

A specific feature of the present invention resides in the provision of a frequency modulator connected to source of microwave energy, which modulator sweeps the frequency of the source through a predetermined range which effectively changes the transmission path from the radiating element to the sample at least one-half wavelength of the microwave energy.

Another feature of the present invention resides in the provision of means for continuously changing the physical distance between the radiating element and the sample, with the change in the physical distance being sufficient to provide a change of at least one-half wave length in the transmission path of the microwave energy therebetween.

Still another feature of the present invention resides in the provision of a dielectric disc of varying thickness mounted between the radiating element and the sample and means for rotating the disc at a predetermined rate to present a continuously changing transmission path through the disc to the microwave energy impinging on the sample.

These and other objects, features and advantages of the present invention will be more fully realized and understood from the following detailed description when taken in conjunction with the accompanying drawings wherein:

BRIEF DESCRIPTION OF THE DRAWINGS

FIG. 1 is a diagrammatic view of an apparatus for measuring the amount of moisture in a sample and illustrates the transmission of energy to and from the sample;

FIG. 2 is a diagrammatic showing of an apparatus for measuring the amount of moisture in a sample and constructed in accordance with the principles of the present invention;

FIG. 3 is a diagrammatic showing of another embodiment of the present invention for measuring the amount of moisture in a sample;

FIG. 4 is a diagrammatic showing of still another embodiment of the present invention;

FIG. 5 is a diagrammatic showing of another embodiment of the present invention;

FIG. 6 is a diagrammatic showing of an apparatus for measuring the amount of moisture in a sample which employs apparatus for amplifying the transmitted energy passing through the sample;

FIG. 7 is a diagrammatic showing of still another embodiment of the present invention for measuring the moisture content in a sample in which the moisture content is relatively low;

FIG. 8 is an end view of the measuring system illustrated in FIG. 7;

FIG. 9 is still another embodiment of the apparatus of the present invention for measuring the moisture content of a sample wherein the moisture content is relatively low;

FIG. 11 is a side elevational view of an apparatus for mounting a pair of microwave horns on opposite sides of a sample and disposed for relative movement therebetween;

FIG. 12 is a front view of the apparatus illustrated in FIG. 11;

Like reference numerals throughout the various views of the drawings are intended to designate the same or similar structures.

DESCRIPTION OF THE PREFERRED EMBODIMENTS

Figure 10:
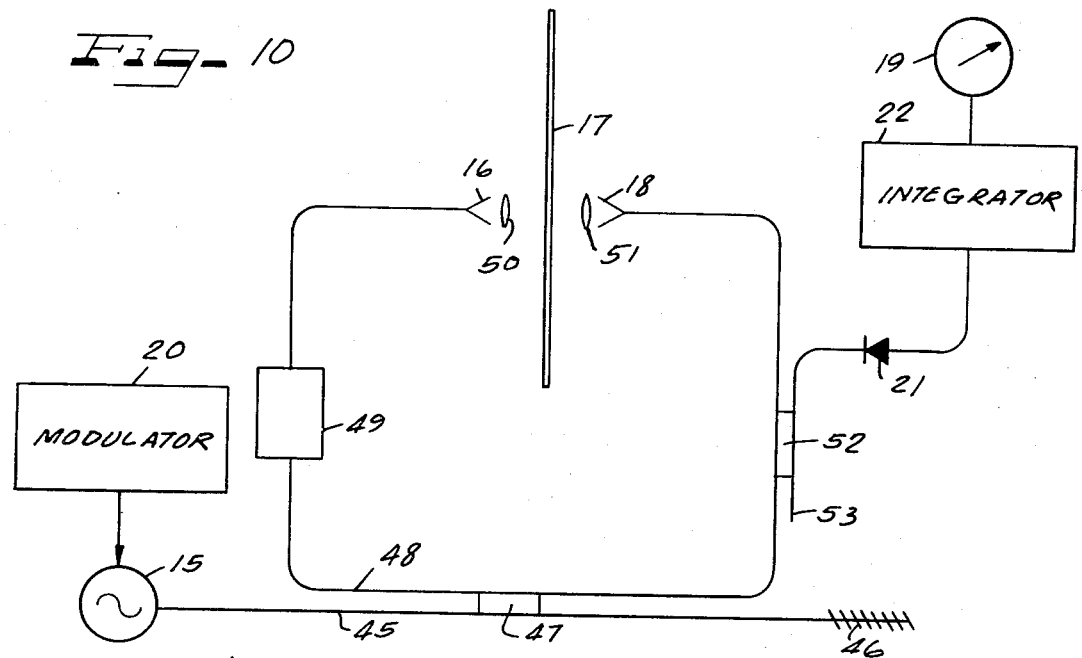
FIG. 10 is a diagrammatic showing of an apparatus for measuring the moisture content of a sample and constructed as a travelling wave resonator for overcoming the low loss encountered in relatively dry paper.
Figures 13, 14, 15:
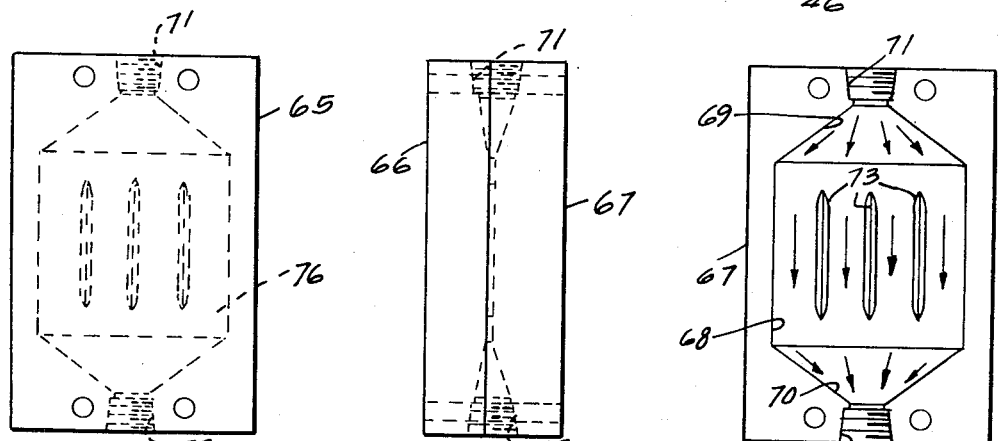
FIG. 13 is an elevational view of a structural unit employed for handling a slurry and which is adapted to be supported between a pair of microwave horns for determining the amount of moisture content therein.
FIG. 14 is a side elevational view of the structural unit illustrated in FIG. 13.
FIG. 15 is an elevational view of one of the components of the structural unit illustrated in FIGS. 13 and 14.
Figure 16:
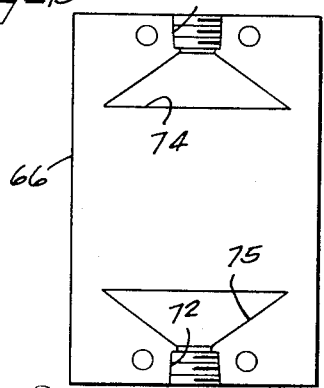
FIG. 16 is an elevational view of the other component of the structural unit illustrated in FIGS. 13 and 14 and disposed for assembly with the component illustrated in FIG. 15.

With reference to FIG. 1 of the drawings, there is shown diagrammatically an apparatus for measuring the moisture content of a paper web. As shown therein, a microwave energy source 15 is connected to a microwave energy transmitting horn 16 which is disposed for transmitting microwave energy designated $P_i$ toward a sample 17, such as a paper web. The energy $P_t$ transmitted through the sample is detected or received by a microwave energy receiving horn 18 which is connected to an indicating device 19. The reflected energy $P_r$ is transmitted back toward the transmitting horn 16. Determination of the moisture content of the sample 17 is provided by a measure of the amount of energy $P_t$ which is detected by the receiving horn 18.

When the sample 17 is placed between the horns 16 and 18, a standing wave is established which is dependent upon the amount of reflected energy from the surface and the position of the sample with respect to the horns. Movement of the sample 17 through a quarter wavelength produces conditions of cancellation and addition of the microwave energy which appears as minimum and maximum reflected power. Minimums or maximums of the standing wave are found to appear every one-half wavelength. Because of the difficulty in maintaining the position of the sample fixed with respect to the horns, the present invention contemplates a system which eliminates the error caused by the standing wave which changes with changes in the sample position.

In order to eliminate the problem of sample position sensitivity, the present invention contemplates the technique of sweeping the frequency of the signal source 15 thus obtaining an average DC reading of the varying transmitted power. If certain minimum conditions are met, the average reading is independent of sample position and serves as a very useful measurement of absorption of the microwave energy by the moisture within the sample 17.

The condition which must be met is that the broad band frequency modulation of change of microwave frequency will be of sufficient change to produce at least a one-half wavelength change in transmission path between the transmitting horn 16 and the sample 17 to insure passing from a minimum to a maximum of reflected power. It is not necessary to begin at any given condition of reflected power, if the change is at least one-half wavelength in the transmission path.

If, for example, a center frequency of 22,250 gigacycles (1.35 cm) is generated by the source 15, a total sweep of 1 gigacycle will be sufficient to provide a one-half wavelength change in the transmission path between the transmitting horn 16 and the sample 17. The total sweep of 1 gigacycle corresponds to wavelengths of 1.32 to 1.38 cm. To shift one-half wavelength, the minimum distance to the sample 17 from the horn 16 may be calculated as follows:

$$(\lambda/2) = (1.35/2) = 0.675 \text{ cm};$$

wherein $\lambda$ is the wavelength of the signal;

$$\Delta\lambda = \lambda max - \lambda min = 1.38 - 1.32$$

$$= 0.06 \text{ cm}(\Delta f = 1CC);$$

$$L = (\lambda/2) \cdot (1/\Delta\lambda) = (0.675/0.06) = 11.28 \text{ cm};$$

wherein $L$ is the minimum distance between the receiving horn and the sample or the transmitting horn and the sample.

In practice, either greater separation distance or greater sweep of frequency appears necessary to obtain a good average value.

In practice, either greater separation distance or greater sweep of frequency appears necessary to obtain a good average value. For instance, a frequency modulation of at least 2 or 3 gigahertz at 22 gigahertz center frequency appears necessary.

It has also been found that sample position sensitivity may be significantly reduced by the method of slanting the sample web with respect to the microwave horns 16 and 18.

The electronic sweep of klystrons is limited to about 50 megahertz. To obtain a minimum of one-half wavelength shift would require a separation distance of approximately 11 feet. Therefore, the use of a klystron would probably not prove practical. However, devices are available, such as backward wave oscillators, that will provide a sweep of the frequency of approximately 6 or 8 gigahertz.

One embodiment of applicant's invention for providing such a sweep of the source frequency is illustrated in FIG. 2 of the drawings. As shown therein, the source 15 may take the form of a microwave oscillator which is controlled by a modulator 20 to provide a frequency sweep of the signal at the output thereof. The output of the oscillator 15 is connected to the transmitting microwave horn 16 which transmits microwave energy through the sample 17 to the receiving horn 18. The horn 18 is connected to a rectifier 21 to an integrator 22. The continually changing frequency signal which is detected by the horn 18 is integrated by the integrator 22 to provide an average thereof as a DC signal which is supplied to an indicating device 19. The average value of the signal detected by the receiving horn 18 provides a measurement of the moisture content within the sample 17 which is independent of the position of the sample 17.

Another embodiment of applicant's invention is illustrated in FIG. 3 of the drawing. As shown in FIG. 3, the oscillator 15 provides a signal of fixed frequency to the transmitting horn 16. Disposed between the transmitting horn 16 and the sample 17 is a "chopper" in the form of a wheel or disc of varying thickness made of a high dielectric low loss material. One face 23a of the disc 23 is curved and the other face 23b thereof is flat to present a varying thickness to the energy transmitted from the horn 16 toward the sample 17 as the disc 23 is rotated. The disc 23 is mounted on a rotatable shaft which is connected to a motor 25 for rotation of the disc 23. Rotation of the disc 23 causes a change in the transmission path length of one-half wavelength which is achieved by variation of the dielectric material thickness during such rotation. The flat surface 23b of the disc 23 minimizes and maintains constant the reflections to the transmitting horn 16. The signal detected by the receiving horn 18 is integrated by the integrator 22 to provide an average of the detected signal. The average value of such signal is supplied in the form of a DC voltage to the indicator 19.

Still another embodiment of applicant's invention is illustrated in FIG. 4 which employs a device for maintaining the sample 17 fixed with respect to the horns 16 and 18. As shown therein, the source 15 of microwave energy is modulated by the modulator 20, and the modulated signal at the output of the source 15 is connected to the transmitting horn 16. As in the previously described embodiments, the receiving horn 18 is connected to the rectifier 21 to the integrator 22, which is in turn connected to the indicating device 19. The source 15 is connected to the horn 16 and the horn 18 is connected to the integrator 22 by respective wave guides which are diagrammatically illustrated by the single line connections in the figure. In order to maintain the horn spacing rigid, a mechanical support 26 is provided between the respective wave guides. The sample 27 is supported on a Teflon shoe 27, which is in turn supported on the receiving horn 18. In this manner, the spacing between the horns 16 and 18 is rigidly maintained by means of the mechanical support 26 and the position of the sample 17 is rigidly maintained with respect to the horn 18.

FIG. 5 illustrates another embodiment of applicant's invention which employs a method of measurement based upon the dielectric constant (reflection) of the sample 17, rather than the loss factor (absorption) of the sample 17. At any air to dielectric interface, a reflection of incident energy occurs. The amount of reflected energy or the reflection factor is a function of the dielectric constant of the material, as expressed by the following, wherein $r$ is the amount of reflected energy and $\epsilon$ is the dielectric constant of the material:

$$r = \frac{\sqrt{\epsilon - 1}}{\sqrt{\epsilon + 1}}$$

As shown in FIG. 5, the modulator 20 is connected to the source of microwave energy 15 and modulates the output thereof which is connected to a wave guide 16a to the transmitting horn 16. A portion of the energy which is transmitted by the horn 16 passes through the sample 17 and is absorbed on a non-reflecting surface 28. The remaining portion of the energy transmitted by the horn 16 is reflected from the sample 17 and returns to the horn 16. A directional coupler 29 is connected between the wave guide 16a and a wave guide 29a for coupling the reflected energy received by the horn 16 to the wave guide 29a. The wave guide 29a is connected through the rectifier 21 to the integrator 22, which is in turn connected to the microwave indicator 19 which provides an indication of the reflected energy from the sample 17. Since the dielectric constant of the sample 17 varies with the moisture content, measurement of such reflected energy provides an indication of the amount of moisture content within the sample 17.

A difficulty encountered in applying the frequency modulation method to measuring moisture in a sample occurs when the moisture content is relatively low, for instance below 30 percent. With high moisture content, an adequate signal to noise ratio is obtained when the horns 16 and 18 are positioned perpendicular to the plane of the sample 17 and the energy is passed through the sample only once. At low moisture content, such as 5 to 15 percent moisture, the attenuation attained by passing the energy once or even twice through the sheet is not adequate for practical use. It is possible to obtain an adequate attenuation level by passing the energy through the sheet several times.

Such an arrangement is illustrated in FIG. 6, wherein the frequency modulator is connected to the source 15, which is in turn connected to the transmitting horn 16. It has been found that a minimum of six passes of the microwave energy through the sample 17 is necessary in order to achieve a usable signal to noise ratio. However, when the microwave energy is transmitted through the sample 17 a number of times, it was found that a high radiation loss occurred with each transmission of the microwave energy from a separate horn. It was found that this difficulty is overcome by the use of dielectric microwave lenses which collimate the microwave energy and reduce the losses to a tolerable level.

As shown in FIG. 6, the microwave energy transmitted from the horn 16 and detected by a horn 30 passes through dielectric microwave lenses 31 and 32 positioned on opposite sides of the sample 17 between the horns 16 and 30. The horn 30 is connected by a wave guide to a transmitting horn 33 wherein the microwave energy is retransmitted to the sample 17 to a receiving horn 34. Dielectric microwave lenses 35 and 36 are positioned on opposite sides of the sample 17 between the horns 33 and 34. The receiving horn 34 is connected by means of a wave guide to a transmitting horn 37 which transmits the microwave energy through the sample 17 to the receiving horn 18 which is connected to the rectifier 21 and the integrator 22 to the microwave indicator 19. Dielectric microwave lenses 38 and 39 are positioned on opposite sides of the sample 17 between the horns 37 and 18 to again collimate the microwave energy and reduce the losses resulting by the retransmission of the microwave energy through the sample 17.

Another method of obtaining adequate attenuation level is that of transmitting the microwave energy across the full width of the sample 17. Such method is illustrated in FIGS. 7 and 8 of the drawings, wherein the transmitting horn 16 is positioned at one edge of the sample 17 and the receiving horn 18 is positioned at the opposite edge thereof. Although this method provides adequate attenuation level, the radiation losses can be relatively high over the large distance of measurement. This problem of radiation losses, however, is overcome by the use of microwave lenses 40 and 41 positioned at opposite edges of the sample 17 and adjacent respective horns 16 and 18. The lenses 40 and 41 collimate the energy and improve the efficiency of the transmission across the distance of the sample 17.

Transmitting the microwave energy across the full width of the sample 17, however, can only provide an integrated moisture content across the width of the sample and is not suitable for moisture profiling. It has been found, however, that the same concept can be employed while maintaining a capability of profiling of the moisture content across the width of the sample 17. This is accomplished by traversing the microwave energy across the width of the sample 17 at relatively shallow angles with respect thereto. Such method is illustrated in FIG. 9 wherein the transmitting horn 16 is positioned adjacent to and below one edge of the sample 17 and the receiving horn 18 is positioned adjacent to and above the opposite edge of the sample 17. In order to reduce the radiation losses, microwave lenses 42 and 43 are positioned adjacent respective horns 16 and 18 for colliminating the energy and improving the efficiency of the transmission across the distance of the sample 17. The line of transmission and reception direction between the horns 16 and 18 defines a relatively shallow angle designated with the reference numeral 44 with the plane of the sample 17.

With the arrangement illustrated in FIG. 9, profiling is accomplished by raising and lowering the horns 16 and 18 as indicated by the arrows adjacent thereto on the drawing in a manner which would maintain alignment of the microwave horns 16 and 18 and their radiated energy, but would tend to move the area of attenuation to different positions on the sample 17.

FIG. 10 illustrates another embodiment of applicant's invention which is employed for overcoming the low loss encountered in relatively dry samples under examination. In essence, the structure illustrated in FIG. 10 is a travelling wave resonator. A typical description of a travelling wave resonator may be found in the I.R.E. transactions on microwave theory and techniques, April 1958, by L. J. Millsevic and R. Vautey on page 136. A ring resonator is described in "Microwave Engineering," A. F. Harvey, pages 201–202. The travelling wave resonator, like the cavity devices, might be employed to amplify low level attenuation.

As shown in FIG. 10, the modulated source of energy from the generator 15 is transmitted through a wave guide 45 to a termination 46. The wave guide 45 is connected through a directional coupler 47 to a wave guide 48 which is connected at one end thereof through a phase shifter 49 to the transmitting horn 16 and at the opposite end thereof to the receiving horn 18. The sample 17 is mounted between the horns 16 and 18 and a pair of dielectric lenses 50 and 51 are disposed on opposite sides thereof adjacent the horns 16 and 18. A directional coupler 52 is connected between the wave guide 48 adjacent the receiving horn 18 and a wave guide 53. The wave guide 53 is connected through the rectifier 21 and integrator 22 to the microwave indicator 19.

An arrangement for changing the position of the sample 17 with respect to the horns 16 and 18 is illustrated in FIGS. 11 and 12 of the drawings. As shown therein, the horn 16 is mounted on the support member 54. A plurality of rails 55, 56 and 57 are supported between the support member 54 and a second support member 58. The support members 54 and 58 are fixedly mounted with respect to one another. Movably mounted on the rails 55, 56 and 57 is a first movable support member 59 which supports the sample 17 thereon and a second movable support member 60 which supports the receiving horn 18 thereon. The receiving horn 18 is connected by means of a wave guide 61 to the crystal detector or rectifier 21. The arrangement illustrated in FIGS. 11 and 12 permit movement of either the sample 17 or the receiving horn 18 with respect to the transmitting horn 16. If such movement is effected over a distance which is equal to one-half the wavelength of the microwave energy, the sensitivity due to sample position discussed above is eliminated.

The broad bend frequency modulated microwave moisture measurement is applicable to many products, such as paper, textiles, foods, etc. In addition, however, all of the above described systems for the measurement of moisture in a sample by the broad band frequency modulated technique can also be employed for measuring moisture in a slurry. The technique employed by the present invention for measuring moisture in a slurry is that of extracting from a main slurry line a portion of the slurry and distributing the contents into the form of a sheet or web. This is accomplished by distributing the slurry in a relatively thin or narrow cavity provided in a material of relatively low loss dielectric.

FIGS. 13–16 illustrated a structural part which contains a relatively thin or narrow cavity therein into which the slurry can be distributed. The illustrated structural part containing the cavity therein can be supported between the microwave horns 16 and 18 for determining the moisture content of the slurry. As shown in FIGS. 13–16 a slurry distributor 65 is formed of a pair of plates 66 and 67 made of a low loss dielectric material. A relatively wide and shallow channel 68 is formed in one surface of the plate 67 which is joined by beveled portions 69 and 70 to an inlet 71 and an outlet 72 respectively. Ribs 73 extend upwardly from a bottom surface of the channel 68 and serve to disperse the slurry equally throughout the width of the channel 68. The plate 66 also includes a pair of beveled portion 74 and 75 which join with the inlet 71 and the outlet 72 respectively. When the channeled surfaces of the plates 66 and 67 are abutted with one another and the plates are secured together in such relationship, a relatively thin chamber 76 is formed between the inlet 71 and the outlet 72 for dispersing the slurry passing therethrough into a relatively thin sheet.

It will be understood that variations and modifications may be effected without departing from the spirit and scope of the novel concepts of this invention.

The invention claimed is:

1. Apparatus for measuring the amount of moisture in a sample in the form of a web, comprising:
   a source of microwave energy;
   a microwave energy radiating element connected to said source and positioned adjacent one edge of said web to impinge microwave energy on one side of said web;
   a microwave energy receiving element positioned adjacent the other edge of said web to receive microwave energy emanating from the other side of the sample and aligned with said radiating element so that they are laterally offset from each other relative to the web;
   a microwave energy indicator connected to said receiving element and said sample being in the form of a web with its transverse dimension lying generally in a plane which makes an acute angle with a line extending between said radiating and receiving elements such that energy enters generally from one side of the web adjacent one edge and exits from the other side of the web adjacent the other edge;
   means for continuously modulating the source of microwave energy so as to change the energy transmission path through the sample by at least one-half wavelength of the microwave energy;
   at least one microwave collimating lens mounted between said radiating element and said receiving element; and
   scanning means for moving said radiating and receiving elements together in synchronism relative to said web while maintaining alignment of said radiating and receiving element so as to move the area of attenuation transversely back and forth across said web.

* * * * *